United States Patent
Charreyre

(10) Patent No.: US 12,275,016 B2
(45) Date of Patent: Apr. 15, 2025

(54) TREATMENT PLANT WITH OPTIMISED DENSIMETRIC SORTING AND RELATED TREATMENT PROCESS

(71) Applicant: AVENIR INNOVATION, Allegre (FR)

(72) Inventor: Fabien Michel Alain Charreyre, Le-Puy-en-Velay (FR)

(73) Assignee: AVENIR INNOVATION, Allegre (FR)

( * ) Notice: Subject to any disclaimer, the term of this patent is extended or adjusted under 35 U.S.C. 154(b) by 0 days.

(21) Appl. No.: 17/772,442

(22) PCT Filed: Oct. 22, 2020

(86) PCT No.: PCT/FR2020/051908
§ 371 (c)(1),
(2) Date: Apr. 27, 2022

(87) PCT Pub. No.: WO2021/084190
PCT Pub. Date: May 6, 2021

(65) Prior Publication Data
US 2022/0379318 A1    Dec. 1, 2022

(30) Foreign Application Priority Data
Oct. 29, 2019    (FR) ..................... 1912159

(51) Int. Cl.
*B03B 9/06*  (2006.01)
*B07B 1/22*  (2006.01)
*B07B 13/11*  (2006.01)

(52) U.S. Cl.
CPC ............... *B03B 9/06* (2013.01); *B07B 1/22* (2013.01); *B07B 13/11* (2013.01)

(58) Field of Classification Search
CPC .. B07B 9/06; B07B 1/22; B07B 13/11; B03B 9/06

(Continued)

(56) References Cited

U.S. PATENT DOCUMENTS 1,250,554 A * 12/1917 Bryan ................ B01D 46/0005
209/31
3,368,677 A *  2/1968 Bradley, Jr. ............. B24B 55/06
209/33

(Continued)

FOREIGN PATENT DOCUMENTS

FR    2.160.528 A1    6/1973
FR    3018705 A1      9/2015

OTHER PUBLICATIONS

Fleury, Sylvie; "Method for Processing Waste, in Particular Household Waste, and Installation for Implementing the Method" (English translation), Sep. 25, 2015, worldwide.espacenet.com (Year: 2015).*

*Primary Examiner* — Terrell H Matthews
*Assistant Examiner* — Molly K Devine
(74) *Attorney, Agent, or Firm* — Nath, Goldberg & Meyer; Joshua B. Goldberg

(57) ABSTRACT

A plant for treating a mixture of waste products from a domestic waste collection, comprising a unit for treating a mixture (2B) of materials obtained from the mixture of waste, a substantial portion of the mass of the mixture of materials being formed by biodegradable materials, the treatment unit comprising a trommel screen (3) provided with a wall (4) for separating the mixture (2B) of materials into a first fraction (5) passing over the wall (4) and a second residual fraction, two densimetric tables, and a ballistic separation means
(8) which is positioned between the trommel screen (3) and the densimetric tables
to collect the first fraction (5) and to supply the densimetric tables with a first sub-fraction and second sub-fraction (9, 10) of materials, respectively. First subfraction (9) formed by materials having a density lower than the materials forming the second sub-fraction (10).

9 Claims, 3 Drawing Sheets

(58) Field of Classification Search
USPC .................................................... 209/3, 31
See application file for complete search history.

(56) References Cited

U.S. PATENT DOCUMENTS

| | | | | |
|---|---|---|---|---|
| 4,264,352 | A | * | 4/1981 | Houser .................. B07B 9/00 |
| | | | | 209/31 |
| 6,136,590 | A | | 10/2000 | Kruse |
| 2018/0141087 | A1 | * | 5/2018 | Ivanovich Orsyk ...... B07B 9/02 |

* cited by examiner

TREATMENT PLANT WITH OPTIMISED DENSIMETRIC SORTING AND RELATED TREATMENT PROCESS

This is a National Phase Application filed under 35 U.S.C. 371 as a national stage of PCT/FR2020/051908, filed Oct. 22, 2020, an application claiming the benefit of French Application No. FR1912159, filed Oct. 29, 2019, the content of each of which is hereby incorporated by reference in its entirety.

TECHNICAL HELD

The present invention relates to the field of waste treatment, and in particular the treatment of wastes from household refuse collection, for the recycling, valorization (recovery) or retreatment thereof.

PRIOR ART

The invention more particularly relates to a plant for treating a primary mixture of wastes from household and similar refuse collection, a non-negligible portion of the mass of the primary mixture of wastes being formed by biodegradable wastes, said primary mixture of wastes comprising non-biodegradable wastes.

The invention also relates to a method for treating a primary mixture of wastes from household and similar refuse collection, a non-negligible portion of the mass of the primary mixture of wastes being formed by biodegradable wastes, said primary mixture of wastes comprising non-biodegradable wastes.

Industrial treatment of household refuse, after collection thereof, requires extensive work of sorting, conversion and refining of the wastes forming said refuse for the recycling, valorization (recovery) or retreatment of the largest possible part of these wastes. In the absence of industrial means for quickly and efficiently treating the very large amounts of household wastes produced daily, a significant amount of waste is generally landfilled, buried or incinerated, around the world, whereas a large part of these wastes could be recycled or valorized, in particular by composting, methanization or also conversion into solid recovered fuel.

To address this both environmental and economic issue, it known in particular to use, in the field of industrial household refuse treatment, so-called mechanical-biological treatment (MBT) plants and methods. These plants and methods implement a combination of mechanical operations of shredding, sorting and grinding, and biological operations, either aerobic (composting) or anaerobic (methanization), in order to treat in the best possible way the household refuse, the wastes of which generally have very varied and disparate characteristics in terms of nature, size, shape, dimensions, density or texture.

A generally observed advantage of such mechanical-biological treatment plants and methods is their ability to treat significant volumes of waste and to allow the capture of a larger amount of biologically valorizable biodegradable wastes (composts and biogas) than is usually possible with selective waste collection. It nevertheless remains, for these mechanical-biological treatment plants and methods, a strong challenge of continuous performance improvement, in particular in terms of ability to effectively treat any type of waste (limiting the volume of non-treatable waste and the volume of refusals generated, destined for landfill or incineration), and of compost and biogas production yield and quality.

DISCLOSURE OF THE INVENTION

The objects assigned to the present invention aim to address this challenge and to therefore propose a new plant and new method for quickly treating, in a particularly accurate and efficient way, large volumes of household wastes, in such a way as to allow particularly qualitative recycling and/or valorization of a very large portion of the mixture of wastes, and in particular the portion of biodegradable wastes contained therein.

Another object of the invention aims to propose a new plant and new method for treating a mixture of wastes making it possible to obtain a compost of particularly high quality.

Another object of the invention aims to propose a new plant and new method for treating a mixture of wastes making it possible to obtain a biogas with very little, if any, ultimate wastes to be landfilled or incinerated.

Another object of the invention aims to propose a new plant and new method for treating a mixture of wastes that are easy to implement in an industrial context, and in particular within the framework of an industrial process for the mechanical-biological treatment of household and similar refuse.

Another object of the invention aims to propose a new plant and new method for treating a mixture of wastes allowing a treatment of the mixture of wastes in a predominantly or even fully automated way.

Another object of the invention aims to propose a new plant and new method for treating a mixture of wastes making it possible to generate products of quite higher value than the initial value of the mixture of wastes.

Another object of the invention aims to propose a new plant of simple design and limited bulk.

The objects assigned to the invention are achieved by means of a plant for treating a primary mixture of wastes from household and similar refuse collection, a non-negligible portion of the mass of said primary mixture of wastes being formed by biodegradable wastes, said primary mixture of wastes comprising non-biodegradable wastes, said treatment plant comprising a unit for treating a secondary mixture of materials obtained from said primary mixture of wastes, a non-negligible portion of the mass of said secondary mixture of materials being formed by biodegradable materials, said treatment unit comprising a rotary trommel provided with a separation wall with a series of separation through-holes for separating the secondary mixture of materials into a first fraction of materials passing through said separation wall via the series of separation holes and a second residual fraction of materials, the secondary mixture of materials being intended to flow along said separation wall to be separated thereby, said treatment unit also comprising at least one first and second densimetric tables, and a ballistic separation means positioned between said trommel and said densimetric tables to collect said first fraction of materials and feed the first and second densimetric tables with at least one first and second subfractions of materials, respectively, the first subtraction of materials being formed of materials having an average density lower than an average density of the materials forming the second subtraction of materials.

The objects assigned to the invention are also achieved by means of a method for treating a primary mixture of wastes from household and similar refuse collection, a non-negligible portion of the mass of the primary mixture of wastes being formed by biodegradable wastes, said primary mixture of wastes comprising non-biodegradable wastes, said method comprising a step E1 of treating a secondary mixture of materials obtained from said primary mixture of wastes, a non-negligible portion of the mass of said secondary mixture of materials being formed by biodegradable materials, said treatment step E1 comprising the following successive steps:

an operation O1 in which said secondary mixture of materials is introduced into a rotary trammel provided with a separation wall with a series of separation through-holes, and said secondary mixture of materials is separated into a first fraction of materials passing through said separation wall via the series of separation holes and a second residual fraction of materials, the secondary mixture of materials flowing along said separation wall to be separated thereby, an operation O2 in which said first fraction of materials is separated, using a ballistic separation means, into at least one first and second subfractions of materials, the first subfraction of materials being formed of materials having an average density lower than the average density of the materials forming the second subfraction of materials, and an operation O3 in which a densimetric sorting is applied to each of said first and second subfractions of materials, respectively, using at least one first and second densimetric tables, each fed by said ballistic separation means.

BRIEF DESCRIPTION OF THE DRAWINGS

Other features and advantages of the invention will appear and come out in more detail upon reading of the description made hereinafter, with reference to the appended drawings, given only as illustrative and non-limiting example(s), in which.

BEST WAY TO IMPLEMENT THE INVENTION

Figure 1:
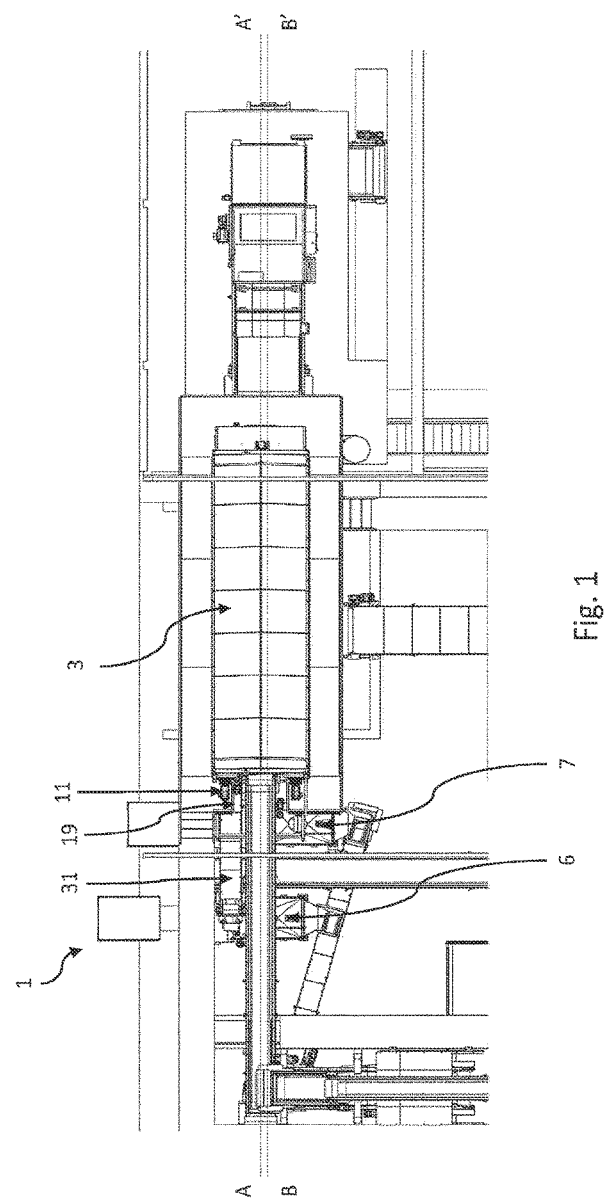
FIG. 1 illustrates, in a partial top view, an embodiment of the treatment unit of a treatment plant according to the invention, in which embodiment the treatment unit comprises two densimetric tables.

According to a first aspect, the invention relates as such to a plant for treating a primary mixture 2A of wastes, aiming to sort, refine, valorize and/or recycle all or part of the wastes thereof, and in particular biodegradable wastes, recyclable wastes, and combustible wastes contained therein. The invention further relates, according to a second independent aspect, a method for treating such a primary mixture 2A of wastes. More specifically, they are wastes from collection of household and similar refuse (HSR, also HSW for "Household and Similar Waste", or OMA for "Ordures Ménagères et Assimilées" in French), i.e. wastes from daily domestic activity of households and "routine" wastes from economical activities (shops, crafts, etc.) and collected in the same conditions as the household wastes, typically as door-to-door collection using garbage trucks.

Preferably, the primary mixture 2A of wastes has not undergone any treatment and forms a raw waste mixture. In particular, no grinding of the raw waste mixture or no previous sorting aiming to segregate one type of waste from another, and in particular to separate biodegradable wastes from non-biodegradable recyclable wastes, was carried out. Preferably, the primary mixture 2A of wastes was collected from households and/or economic operators without said households and/or economic operators having previously sorted or selected the waste collected. In particular, the collection of the primary mixture 2A of wastes was not selective. Obviously, without departing from the scope of the invention, the primary mixture 2A of wastes may have been deprived, on the contrary, from a portion of the recyclable wastes it contains, for example by the households during a pre-sorting, or it may have itself undergone a pre-sorting, for example by the households. It would then be a primary mixture 2A of wastes from a collection of so-called residual household refuse (RHR, also RHW for "Residual Household Waste", or OMR for "Ordures Ménagères Rèsiduelles" in French). The wastes of the primary mixture 2A of wastes are advantageously collected in a raw and undifferentiated way, mixed in bags, such as plastic trash bags closed by the households, Advantageously, prior to step E1 (described hereinafter), the treatment method comprises a step of opening bags, such as plastic trash bags, in which the primary mixture 2A of wastes is contained, in order to release said primary mixture 2A of wastes from said bags so as to carry out step E1. This bag opening step is automated so that no manual treatment is involved. The primary mixture 2A of wastes so released from the bags is then preferentially grouped to form the primary mixture 2A of wastes concerned by the treatment plant and method. The waste bag opening may be made for example using a bag opening device, which the treatment plant may advantageously comprise, to allow the wastes to be released out of said bags, preferably without being damaged or altered.

The primary mixture 2A of wastes concerned by the treatment plant and method according to the invention comprises at least biodegradable wastes and non-biodegradable wastes, said biodegradable wastes forming a non-negligible portion of the mass of the primary mixture 2A of wastes. Advantageously, at least 10%, preferably at least 20%, of the mass of the primary mixture 2A of wastes are formed by biodegradable wastes. Even more advantageously, at least 50%, preferably at least 60%, preferably at least 70%, more preferably at least 80%, of the mass of the primary mixture 2A of wastes is formed by biodegradable wastes. The content of biodegradable wastes in the primary mixture 2A of wastes is not particularly limited. Typically, at least 5%, preferably at least 10%, more preferably at least 20%, of the mass of the primary mixture 2A of wastes is formed by non-biodegradable wastes.

Within the meaning of the invention, "biodegradable waste" means waste that, under the action of a natural environment, comprising for example living organisms and/or air and/or water, can be decomposed, naturally and spontaneously, into various elements likely to cause damages to the natural environment (high demand for oxygen, emission of leachates) unless being stabilized for example by composting. In particular, the living organisms may be formed by micro-organisms such as bacteria, funguses or algae, which are likely to degrade the biodegradable wastes through biological and/or biochemical reactions. Preferably, "biodegradable wastes" means wastes that can be biodegraded that way within a time scale of a human life, one decade, or more preferably one year or a few months, preferably a few weeks. Preferably, "biodegradable wastes" means wastes that are likely to be used in the production and formation of compost by composting these latter, and/or in the production and formation of biogas by methanization of these latter. Within the meaning of the invention, "non-biodegradable wastes" form the other wastes, which do not undergo spontaneously and naturally such a degradation, or which undergo it too slowly. "Non-biodegradable wastes" are in particular not adapted to enter into the formation of compost or biogas. Such non-biodegradable wastes can advantageously comprise recyclable or at least valorizable wastes, "Recyclable wastes" correspond to wastes that can be easily converted, for example chemically or mechanically, so as to form a recycled raw matter similar to a new raw material, and be as such used again in a new product or object manufacturing cycle. Typically, can be considered as "recyclable wastes" the metal wastes, formed by any type of metals, some plastic wastes, glass, paper and cardboard, etc. "Valorizable wastes" are wastes that, although not being easy to convert into recycled raw material, can nevertheless find an economic use. They are typically wastes with a high calorific value that makes them suitable for conversion, valorization, into solid recovered fuels (SRFs), intended to be subsequently burnt in suitable boilers or furnaces (for example in cement plants). The expressions "recyclable wastes" and "valorizable wastes" preferably exclude the biodegradable wastes, even if the conversion of these latter into compost and biogas imparts them in practice a valorizable nature. Such non-biodegradable wastes can further comprise ultimate wastes (complex wastes, etc.) that are unusable, i.e. neither recyclable nor even valorizable, and typically destined for landfill or incineration. Advantageously, a non-negligible portion of the mass of the primary mixture 2A of wastes concerned by the plant and method according to the invention is formed by non-biodegradable recyclable (or at least valorizable) wastes, for example 10% of the mass of the primary mixture 2A of wastes.

The treatment plant according to the invention comprises a unit 1 for treating a secondary mixture 2B of materials obtained from the primary mixture 2A of wastes described hereinabove. An embodiment of such a treatment unit 1 is illustrated, in a partial top view, in FIG. 1. The treatment unit 1 advantageously forms a subset integrated to the treatment plant and that is more specifically dedicated to the treatment of a secondary mixture 2B of materials that has been produced by the treatment plant, upstream from the treatment unit 1, from the primary mixture 2A of wastes described hereinabove. As such, the materials forming the secondary mixture 2B of materials may be consisted by wastes as initially present in the primary mixture 2A of wastes (i.e. not converted nor biodegraded) and/or by materials resulting from a conversion or a degradation at least partial of wastes included in the primary mixture 2A of wastes. In any case, a non-negligible portion of the mass of said secondary mixture 2B of materials is formed by biodegradable materials, according to the above definition of the term "biodegradable". In particular, said biodegradable materials are typically formed by organic matter, i.e. matter derived from living beings (plant matter, animal matter, etc.), and to a lesser extent, by matter derived from a human-induced conversion and having a biodegradable nature (for example, scraps of wet paper or plastic bags of plant origin), within the meaning of the above. In this respect, said treatment plant 1 thus advantageously constitutes a unit for the post-treatment or refining of materials resulting from a first treatment by the treatment plant, and more specifically, a unit for the post-treatment or refining of a mixture rich in biodegradable materials. Preferably, the biodegradable materials in question form at least 40%, preferably at least 45%, preferably at least 50%, preferably at least 60%, preferably at least 70%, more preferably at least 80%, of the mass of the secondary mixture 2B of materials implemented by the treatment unit. In addition to said biodegradable materials, the secondary mixture 2B of materials advantageously comprises non-biodegradable materials (according to the above definition of the term "biodegradable"), also coming from said primary mixture 2A of wastes.

According to the invention, the treatment unit 1 comprises a trammel 3, or rotary screen, which is rotatably mounted about its longitudinal axis. The rotary trammel 3 is provided with a separation wall 4, which extends along a longitudinal axis of extension A-A' about which said separation wall 4 is rotatably mounted. The separation wall 4 is provided with a series of separation through-holes (not illustrated) for separating the secondary mixture 2B of materials into, on the one hand, a first fraction 5 of materials passing through said separation wall 4 via the series of separation holes and, on the other hand, a second residual fraction of materials (that thus does not pass through the separation wall 4 via the series of separation holes), the secondary mixture 2B of materials being intended to flow along said separation wall 4 to be separated thereby. Preferentially, the separation wall 4 has a general cylindrical shape of circular cross-section, the height of which forms the longitudinal axis of extension A-A' of the separation wall 4, about which axis A-A' the separation wall 4 can be rotated. As an alternative, said separation wall 4 could have a general shape of a prism or a truncated cone, the height of which could be formed by axis A-A'. Advantageously, the longitudinal axis A-A' of extension and rotation of the separation wall 4 is slightly inclined with respect to the horizontal, so as to favor the flow of the secondary mixture 2B of materials along the separation wall 4, under the effect of gravity in particular, from an inlet port of the trommel 3, at which the secondary mixture 23 of materials is to be introduced into the trommel 3, to an outlet port of the trommel 3, at which the second residual fraction of materials is to be discharged from the trommel 3. In contact with the separation wall 4, the secondary mixture 2B of materials is thus screened, sieved, the first fraction 5 of materials that passes through the separation wall 4 via the separation holes being thus formed by materials which are of smaller size, on average, than the materials forming the second residual fraction of materials. Advantageously, the series of separation holes is distributed over the whole circumference and over the whole length (along axis A-A') of the separation wall 4, in such a way that the separation of the secondary mixture 2B of materials takes place continuously when the separation wall 4 is rotating about axis A-A'.

It is generally meant by "size" a spatial dimension of the material along its longest length, or a characteristic dimension. It is meant by "size" of a material a characteristic geometric dimension of the individual material, which allows it, for example, to pass through a hole of corresponding size if the size of the material is smaller than that of the hole, or, on the contrary, prevents it from passing if the size of said material is larger than that of said hole. It is meant by "second residual fraction of materials" the remaining fraction of materials of the secondary mixture 2B of materials, which did not meet the criteria of separation of the first fraction 5 of materials, in this case the size criterion. However, within the meaning of the invention, nothing prohibits that materials which could have met the criterion of separation, in this case the size, of the first fraction 5 of materials can also be present in the second fraction of materials.

In addition to said trommel 3, which is thus intended to apply an essentially dimensional sorting to the secondary mixture 2B of materials, the treatment unit 1 also comprises at least one first and second densimetric tables 6, 7, and a ballistic separation means 8 positioned between said trommel 3 and said densimetric tables 6, 7 to collect said first fraction 5 of materials and feed the first and second densimetric tables 6, 7 with at least one first and second subfractions 9, 10 of materials, respectively, the first subfraction 9 of materials being formed of materials having an average density lower than an average density of the materials forming the second subfraction 10 of materials.

The treatment plant according to the invention thus implements a combination of a dimensional sorting means, i.e. the trommel 3, and a densimetric sorting means, i.e. the densimetric tables 6, 7. Instead of using a single and same densimetric table, which would be intended to be directly fed with said first fraction 5 of materials (the materials of which may have a large disparity in average density despite the dimensional sorting carried out by the trommel 3), and whose maximum capacities of optimum treatment would be quickly reached, or even exceeded, by those of the trommel 3 (except costly oversizing of the densimetric table or reducing the flow rate of the trommel 3), the treatment plant according to the invention implements at least two separate densimetric tables 6, 7, advantageously arranged parallel to the flow of materials to be treated, each of them being fed with a particular subtraction 9, 10 of the first fraction 5 of materials sorted by the trommel 3. From then on, the flow of sorted materials exiting from the trommel 3 through the separation wall 4 thereof can be easily controlled, even at very high flow rates, by distributing the load on the two (or more) densimetric tables 6, 7. The invention is further based on the observation that the performance of a densimetric table, both in term of flow rate and of sorting accuracy, can be optimized not only by carrying out a dimensional sorting upstream from the densimetric table in order to reduce the dimensional disparity of the materials subjected to the densimetric table, and by controlling the flow of materials entering the densimetric table, but also by feeding the densimetric table with materials whose density disparity has been controlled, limited, upstream from the densimetric table. The invention is moreover based on the idea that such a densimetric presorting of the first fraction 5 of materials coming from the trommel 3 can be carried out, in a simple and efficient way, using a ballistic separation means 8, that is to say using a device designed to allow a separation of said first fraction 5 of materials based on a densimetric criterion, according to the characteristics of a trajectory described by each of the materials forming the first fraction 5 of materials. Indeed, as also known as such, the density of a moving material has an influence on the trajectory that the latter follows when it is projected. Therefore, the treatment plant according to the invention advantageously makes it possible to quickly sort, in a particularly accurate and efficient way, large volumes of household wastes, which allows in fine particularly qualitative recycling and/or valorization of a very large portion of the primary mixture 2A of wastes, and in particular of the secondary mixture 2B of materials coming from the latter.

Considering the just described particular configuration of the treatment unit 1 of the plant, it is advantageously not necessary to use complex and expensive densimetric tables, such as for example ternary densimetric tables, as conventional binary densimetric tables, i.e. densimetric tables designed to separate an incoming flow of materials into two outgoing flows of materials on the basis of only one average threshold density value, can advantageously be used. The design, setting and control of the plant are hence advantageously made easier, and the operation reliability thereof is enhanced. The densimetric tables 6, 7 may possibly have different characteristics from each other (in particular in terms of treatment capacity, and/or power, and/or operating ranges in terms of density and/or size of the incoming materials, etc.). However, the densimetric tables 6, 7 are advantageously identical but with possibly different setting for certain operating parameters.

Obviously, the invention is not limited to the implementation of only two densimetric tables 6, 7, and a ballistic separation means 8 designed to separate the first fraction 5 of materials into only two subfractions 9, 10 of materials of different average densities. Indeed, the treatment unit 1 of the plant may comprise more densimetric tables downstream from trommel 3, for example 3 or 4 (or even more), the ballistic separation means 8 being then designed, adapted, to separate the first fraction 5 of materials coming from the trommel 3 into as many subfractions of materials as densimetric tables.

Figure 2:
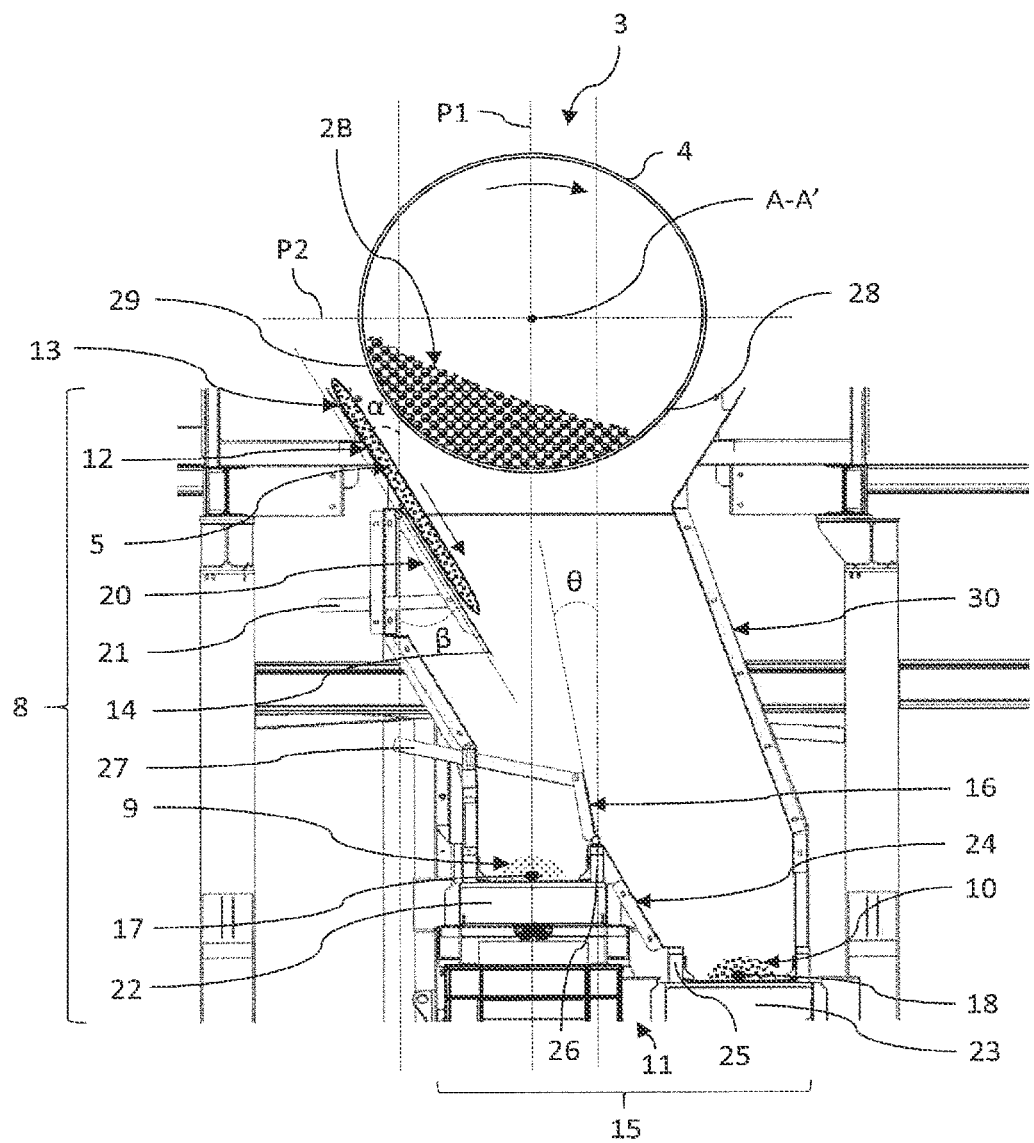
FIG. 2 illustrates, in a partial schematic cross-sectional view, a preferential embodiment of a portion of the treatment unit of the plant according to the invention.

According to a preferential embodiment, illustrated in FIG. 2 the treatment unit 1 comprises a conveyor means 11, which is positioned at a lower altitude than a respective altitude of the trommel 3, the trommel 3 and the separation wall 4 thereof being thus positioned higher than the conveyor means 11. The ballistic separation means 8 advantageously comprises an inclined drop ramp (or corridor or carpet or slide) 12 that comprises, at an upstream end (or upper end), a ramp portion, called collecting portion 13, which is positioned opposite the separation wall 4 of the trommel 3 to collect the first fraction 5 of materials passing through the latter. The drop ramp 12 further has a downstream end 14 (or lower end), opposite to said upstream end, and which is positioned above, and remote from, a feed portion 15 of the conveyor means 11. The downstream end 14 of the drop ramp 12 is therefore positioned at an altitude that is lower than the altitude of the trommel 3 and the separation wall 4 thereof, and that is higher than the respective altitude of the feed portion 15 of the conveyor means 11. Advantageously, the collecting portion 13 of the drop ramp 12 is inclined with respect to the vertical by an angle α between 15° and 70°, preferably between 20° and 60°, more preferably substantially equal to 30°.

The ballistic separation means 8 also comprises at least one ballistic distribution flap (or panel) 16 that defines, on a conveying surface of said conveyor means 11, at least one first area 17 for conveying said first subfraction 9 of materials and a second area 18 for conveying said second subfraction 10 of materials. The conveyor means 11 advantageously comprises an evacuation portion 19, remote from said feed portion 15, and through which the first and second conveying areas 17, 18 are able to feed each of said densimetric tables 6, 7, respectively.

Therefore, the first fraction 5 of materials, which passes through the separation wall 4 of the trommel 3, is collected, recovered, by the collecting portion 13 of the inclined drop ramp 12, which then guides the drop of said first fraction 5 of materials towards the feed portion 15 of the conveyor means 11 positioned at a lower altitude of that of the trommel 3. Sliding along the drop ramp 12 under the effect of gravity, the first fraction 5 of materials is projected into the air towards the feed portion 15 of the conveyor means 11 from the downstream end 14 of the drop ramp 12, according to a distribution and a spatial trajectory of the materials of said first fraction 5 of materials that depends on the respective density of said materials. Positioned above, or on, the conveyor means 11, the ballistic distribution flap 16 is intended to intercept at least part of the flow of said first fraction 5 of materials dropping through the ramp 12, according to the dropping trajectory of the materials forming the latter. Therefore, the low-density materials forming the first subfraction 9 of materials drop on a portion of the conveying surface of the conveyor means 11 located in front of the ballistic distribution flap 16 or are intercepted by the latter and fall in front of the ballistic distribution flap 16 (first conveying area 17). The materials of higher density forming the second subfraction 10 of materials themselves follow a trajectory passing above the ballistic distribution flap 16 and fall on a portion of the conveying surface of the conveyor means 11 located behind the ballistic distribution flap 16 (second conveying area 18). The conveyor means 11 can then transport the so-separated first and second subtractions 9, 10 of materials, to feed the first and second densimetric tables 6, 7, respectively.

Such a ballistic separation means 8 thus makes it possible to separate in a particularly simple and quick way, and using relatively inexpensive and space-saving technical means, the first fraction 5 of materials into at least one first and second subtractions 9, 10 of materials, the materials forming the first subfraction 9 of materials having an average density lower than the respective average density of the materials forming the second subfraction 10 of materials. Obviously, the treatment unit 1 may comprise a plurality of ballistic distribution flaps, typically positioned in parallel one behind the other, in such a way as to separate the first fraction 5 of materials into a number of sub-fractions of materials higher than two, and to define on the conveying surface of the conveyor means 11 a corresponding number of conveying areas, to convey respectively each of the so-separated subfractions of materials towards a distinct densimetric table.

Advantageously, the downstream end 14 of the drop ramp 12 is positioned above and opposite the conveying surface of the conveyor means 11, and even more preferentially above and opposite the first conveying area 17 defined by the ballistic distribution flap 16. As such, the least dense materials, which follow the shortest drop trajectory from the downstream end 14 of the drop ramp 12, can fall directly on the first conveying area 17 defined by the conveyor means 11.

Said drop ramp 12 preferably also comprises a ramp portion, called acceleration portion 20, which extends said collecting portion 13 up to the downstream end 14 of the drop ramp 12, and whose average inclination is adjustable with respect to the vertical (represented in dotted line in FIG. 2), to thus control the speed of drop of said first fraction 5 of materials, along the drop ramp 12, towards the feed portion 15 of the conveyor means 11. Thus, according to the acceleration portion 20 of the drop ramp 12, the first fraction 5 of materials can see its speed of drop more or less accelerated, or on the contrary slowed down, if necessary, towards the feed portion 15 of the conveyor means 11. Such an adjustment of the inclination of the acceleration portion 20 of the drop ramp 12, and hence of the speed of drop of the first fraction 5 of materials, advantageously makes it possible to refine the accuracy of the ballistic separation based on a densimetric criterion carried out using the drop ramp 12 and the ballistic distribution flap 16, in particular according to the nature and composition of the first fraction 5 of materials. For example, in the embodiment illustrated in FIG. 2, the acceleration portion 20 of the drop ramp 12 is pivotally mounted at a lower edge of the collecting portion 13 of the drop ramp 12, in such a way that its inclination can be adjusted by a greater or lesser angle β with respect to the vertical, for example through at least one first, manually or automatically operable, adjustment lever 21. Preferably, the value of said angle β is between 15° and 70°, preferably between 30° and 60°, and more preferably between 35° and 55°. It is to be noted that the acceleration portion 20 can obviously, just as the collecting portion 13, collect a portion of the first fraction 5 of materials sorted by the trommel 3.

Advantageously, the conveyor means 11 is a belt conveyor means, said belt(s) thus forming the conveying surface of the conveyor means 11. This being said, other types of conveyor means could be contemplated, it being understood that a belt conveyor means is particularly well suited to the transportation of a mixture of materials containing biodegradable materials. The conveyor means 11 comprises more particularly at least one conveyor, and therefore advantageously at least one belt conveyor (or transportation belt(s)). Preferably, said conveyor extends longitudinally along a conveying direction B-B' parallel to the longitudinal axis of extension A-A' of the separation wall 4, so as in particular to simplify the design of the treatment unit 1 and to facilitate the integration and arrangement thereof within the treatment plant. Advantageously, the ballistic distribution flap 16 extends longitudinally along a direction substantially parallel to said conveying direction B-B'. The downstream end 14 of the drop ramp 12 is delimited by a downstream edge that advantageously extends along a direction substantially parallel to the conveying direction B-B', so that the projecting distance of the first fraction 5 of materials from the downstream edge of the drop ramp 12 to the ballistic distribution flap 16 is constant along the length of said downstream edge.

According to a first alternative, the conveyor means 11 may comprise a single belt (one-belt) conveyor, said first and second conveying areas being thus defined along a same conveying belt, on either side of the ballistic distribution flap 16. The latter is thus preferentially positioned longitudinally along the conveying direction B-B' of said belt conveyor, for example in such a way as to define on the conveying belt first and second conveying areas of substantially identical widths, Advantageously, the single-belt conveyor is positioned with respect to the trommel 3 in such a way that said average conveying direction B-B' is substantially parallel to the longitudinal axis of extension A-A' of the separation wall 4 of the trommel 3. According to another alternative, retained in the example illustrated in FIG. 2, the conveyor means 11 comprises a first and a second belt conveyors 22, 23, distinct from each other. The ballistic distribution flap 16 is then positioned between the respective belts of said belt conveyors 22, 23, in such a way as to define said first conveying area 17 on the belt of the first conveyor 22 and said second conveying area 18 on the belt of the second conveyor 23. Such a conveyor means 11 comprising a plurality of belt conveyors 22, 23 advantageously makes it possible to convey said first and second subfractions 9, 10 of materials at different speeds and/or along different conveying directions or ways. In particular, it is hence possible to adjust the speed/flow rate of feeding of each of the first and second densimetric tables 6, 7 independently of each other. Advantageously, the first and second conveyors 22, 23 of the conveyor means 11 extend parallel to each other along a same average conveying direction B-B', and are positioned with respect to the trommel 3 in such a way that said average conveying direction B-B' is substantially parallel to the longitudinal axis of extension A-A' of the separation wall 4 of the trommel 3. As illustrated in the example of FIG. 2, said first and second belt conveyors 22, 23 may advantageously be arranged one below the other as a staircase, preferably at an altitude decreasing along the average trajectory of the first fraction 5 of materials dropping through the ramp 12. Such a spatial configuration contributes to the compactness of the treatment unit 1 and to the accuracy of the densimetric separation, because it allows the respective belts of the conveyors 22, 23 to be brought as close together as possible despite the external bulk of these latter.

Possibly, in the case where the belts of the first and second belt conveyors 22, 23 are not contiguous or do not overlap spatially, so that no interstitial space exists between said belts, the treatment unit 1 may advantageously comprise one or several transition plates 24 configured to close up all or part of said interstitial space and to therefore avoid that materials from the first fraction 5 of materials fall into said interstitial space. Thus, in the example illustrated in FIG. 2, the ballistic distribution flap 16 being mounted on a side 25 of the first conveyor 22, the treatment unit 1 comprises a transition plate 16 that connects said side 25 of the first conveyor 22 to an adjacent side 26 of the second conveyor 23, in such a way as to close up the interstitial space here formed between said sides 25, 26. As, in this example, the first and second belt conveyors 22, 23 are arranged one below the other as a staircase, said transition plate 24 is advantageously inclined towards the belt of the second conveyor 23, in such a way as to guide, if necessary, materials forming the second subfraction 10 of materials towards the belt of the second conveyor 23 (second conveying area 18).

Moreover, in order to further limit the bulk of the treatment unit 1, the feed portion 15 of the conveyor means 11 (and in particular of said first and second conveyors 22, 23), is advantageously positioned below, and even more advantageously at least partially opposite, the separation wall 4 of the trammel 3.

Advantageously, the ballistic distribution flap 16 is mounted mobile with respect to the conveying surface of the conveyor means 11 in such a way as to allow the adjustment of the position and/or the orientation of the ballistic distribution flap 16 with respect to the flow of said first fraction 5 of materials dropping through the ramp 12, and to intercept a greater or lesser portion of said first fraction 5 of materials. Therefore, the adjustment of the position and/or inclination of the ballistic distribution flap 16 advantageously allows defining a threshold average density of materials on the basis for which the ballistic distribution flap 16 distributes the materials forming said first fraction 5 of materials on either the first conveying area 17, or the second conveying area 18. That way, the adjustment of the position and/or orientation of the ballistic distribution flap 16 also advantageously makes it possible to modulate the respective mass of the so-separated first and second subfractions 9, 10 of materials intended to be conveyed towards the first and second densimetric tables 6, 7, respectively. For example, in the embodiment illustrated in FIG. 2, the ballistic distribution flap 16 is pivotally mounted, through a lower edge, with respect to the conveying surface defined by the respective belts of the first and second conveyors 22, 23, in such a way that the inclination thereof can be adjusted by a greater or lesser angle θ with respect to the vertical (represented in dotted line), for example through at least one second, manually or automatically operable, adjustment lever 27.

Preferably, the separation wall 4 of the trammel 3 extending, as mentioned hereinabove, along the longitudinal axis of extension A-A about which said separation wall 4 is rotatably mounted, the drop ramp 12 extends longitudinally along said longitudinal axis of extension A-A' of the separation wall 4. In other words, the drop ramp 12 extends along and opposite the separation wall 4, according to an average direction substantially parallel to the longitudinal axis of extension A-A' of the separation wall 4. As such, the collecting portion 13 of the drop ramp 12 may advantageously constitute (or be merged with) a cheek of the trammel 3. Even more preferentially, the drop ramp 12 (and in particular the collecting portion 13 thereof) extends along a length substantially identical to the length of the separation wall 4, in such a way as to collect and guide the materials forming the first fraction 5 of materials along the whole length of separation of the secondary mixture 2B of materials along the longitudinal axis of extension A-A' of the separation wall 4.

When the separation wall 4 of the trammel 3 is rotated about its the longitudinal axis A-A' of extension and rotation, from a certain angular speed, the materials forming the secondary mixture 28 of materials tend to group together, to pile up, in a lower portion of the separation wall 4 by moving up along the latter in the direction of rotation. As illustrated in FIG. 2, the separation wall 4 of the trammel 3 has a first vertical plane P1 and a second plane P2 orthogonal to said first plane P1, said first and second planes P1, P2 containing the longitudinal axis of extension A-A' of the separation wall 4. Said first and second planes P1, P2 define, below the second plane P2, a first and second consecutive angular sectors 28, 29, the second angular sector 29 being located downstream from the first angular sector 28 in the direction of rotation of the separation wall 4 (indicated by an arrow in FIG. 2). Therefore, when the separation wall 4 of the trammel 3 is rotated about axis A-A', the secondary mixture 2B of materials that flows inside the trommel 3 along the separation wall 4 thereof thus generally tends to come at said second angular sector 29, that is to say that, if the secondary mixture 2B of materials occupies the first and second angular sectors 28, 29, more than half the volume and mass thereof however comes at said second angular sector 29. Moreover, the materials forming the first fraction 5 of materials that pass through said separation wall 4 (and in particular the materials having the highest densities) undergo a centrifugal acceleration, due to the rotation of the trommel 3, which tends to give them a drop trajectory that is non strictly vertical but on the contrary oblique in the direction of rotation of the separation wall 4. In order to best collect said first fraction 5 of materials with consideration of these phenomena, the drop ramp 12 (and in particular the collecting portion 13 thereof) is advantageously positioned opposite said second angular sector 29.

Moreover, it has been observed that the materials of the secondary mixture 2B of materials of lower density generally tend to be less subject to the phenomena described above than the materials of higher density. That way, these low-density materials are more likely to go through the separation wall 4 along an average trajectory of vertical direction passing through axis A-A'. That is why it is advantageous, as illustrated in the example of FIG. 2, that the separation wall 4 and the feed portion 15 of the conveyor means 11 are positioned relative to each other in such a way that the longitudinal axis of extension A-A' of the separation wall 4 is positioned above and opposite the first conveying area 17, at which is distributed the first subfraction 9 of materials that is formed of the materials having the lowest average densities, as explained hereinabove.

As the secondary mixture 2B of materials progresses along the separation wall 4 of the trommel 3 to be separated thereby, the quantity and mass of materials passing through said separation wall 4 tend to decrease. That way, the drop characteristics of the materials of the first fraction 5 of materials along the drop ramp 12 can hence vary along axis A-A, which may have an impact on the quality of the densimetric sorting operated by the drop ramp 12 and the ballistic distribution flap 16. Thus, in order to further improve the reliability and accuracy of the ballistic sorting of the first fraction 5 of materials at any point along axis A-A', the acceleration portion 20 of the drop ramp 12 preferentially has an average inclination with respect to the vertical that varies along said longitudinal axis of extension A-A' of the separation wall 4. More precisely, the drop ramp 12 has a decreasing inclination with respect to the vertical, i.e., an increasingly steep slope in the flow direction of the secondary mixture 2B of materials along separation wall 4 of the trommel 3. In practice, such a variable inclination can be obtained in various ways. For example, the acceleration portion 20 of the drop ramp 12 may be formed of a plurality of rigid plates, distinct from each other and joined together along the longitudinal axis of extension A-A' of the separation wall 4, the respective inclination of said plates being adjusted degressively along axis A-A' and in the flow direction of the secondary mixture 2B of materials along the separation wall 4 of the trommel 3. Thus, each plate offers a steeper acceleration slop than the preceding plate in the flow direction of the secondary mixture 2B of materials along the separation wall 4 of the trommel 3. As an alternative, the acceleration portion 20 of the drop ramp 12 may be formed of a single and same plate that has a twisted profile over its length. It may then be either a rigid plate to which such a twisted profile has been definitively provided, or a plate flexible enough to be twisted by adjusting its inclination more sharply at one end than at the other.

Advantageously, the treatment unit 1 comprises, as illustrated in FIG. 1, a hooper 30 (or casing) that is positioned below the trommel 3, opposite both the separation wall 4 thereof and the feed portion 15 of the conveyor means 11. Connecting that way the trommel 3 to the feed portion 15 of the conveyor means 11, advantageously tightly, said hooper 30 prevents the dispersion on the ground of materials of said first fraction 5 of materials. The materials of said first fraction 5 of materials that would not have been collected by the drop ramp 12, or that would have been projected by the latter out of the conveying area of the conveyor means 11, can hence be advantageously guided by the walls of the hooper 30 towards the conveying surface of the conveyor means 11.

Elastomeric dampers (not illustrated) can further be advantageously provided, in particular at the feed portion 15 of the conveyor means 11, in order to limit the risk of bounce (and hence dispersion) of the materials forming said first and second subfractions 9, 10 of materials on the conveying surface of the conveyor means 11.

Possibly, in order to facilitate the positioning of the densimetric tables 6, 7, the treatment unit 1 can further comprise two other conveyors 31, preferably of the belt type, a respective end of which is positioned below and opposite the evacuation portion 19 of the conveyor means 11 to bring respectively the first subfraction 9 of materials up to the first densimetric table 6, and the second subfraction 10 of materials up to the second densimetric table 7, and that along different conveying orientations and/or directions.

Obviously, the invention is not limited to the preferential embodiment of the ballistic separation means 8 described hereinabove. Although being of particularly simple and inexpensive design and of particularly efficient implementation, the latter could possibly be replaced by any other known ballistic separation means allowing such a densimetric separation of said first fraction 5 of materials.

Preferentially, the treatment plant comprises, upstream from said treatment unit 1, at least one biological degradation unit (not illustrated) for applying a biological degradation process to at least part of the biodegradable wastes contained in the primary mixture 2*a* of wastes, in order to biodegrade at least in part said biodegradable wastes and to thus form (at least in part) said secondary mixture 2B of materials. The biodegradable materials, contained in the non-negligible portion of the mass of the secondary mixture 2B of materials that is formed of biodegradable materials, are hence advantageously in this case biodegradable materials at least partially biodegraded, and preferably only partially biodegraded. The biological degradation unit advantageously aims to apply a forced, accelerated biological degradation process.

The treatment plant can thus advantageously comprise, upstream from said treatment unit 1, at least one biological degradation unit that is an aerobic biological degradation unit making it possible to apply an aerobic biological degradation process (or "fermentation") to at least part of the biodegradable wastes contained in the primary mixture 2A of wastes, in order to biodegrade at least in part said biodegradable wastes and to thus form (at least in part) said secondary mixture 2B of materials. The biological degradation unit advantageously aims to apply a forced, accelerated aerobic biological degradation process. As known, such an aerobic biological degradation process consists of forcing the degradation and putrefaction of the biodegradable wastes (and in particular the organic matter contained therein) under the action of aerobic microorganisms (bacteria) naturally present in the primary mixture 2A of wastes and/or added to the primary mixture 2A of wastes and/or caused to multiply in the primary mixture 2A of wastes. Such an aerobic biological degradation unit preferentially comprises at least one aerobic biological degradation rack, known as such, making it possible to apply an aerobic biological degradation cycle to at least part of the primary mixture 2A of wastes in order to biodegrade at least part of the biodegradable wastes of said primary mixture 2A of wastes.

As an alternative or a complement, the treatment plant can advantageously comprise, upstream from said treatment unit 1, at least one biological degradation unit that is an anaerobic biological degradation unit making it possible to apply an anaerobic biological degradation process (or "digestion"), i.e. a methanization process, to at least part of the biodegradable wastes contained in the primary mixture 2A of wastes, in order to biodegrade at least in part said biodegradable wastes, in such a way that all or part of a residual matter coming from said anaerobic biological degradation process will advantageously form (at least in part) the secondary mixture 2B of materials. Thus a biogas, essentially consisted of methane and carbon dioxide, is also obtained. The biological degradation unit advantageously aims to apply a forced, accelerated anaerobic biological degradation process. As known, such an anaerobic biological degradation process consists of forcing the degradation of the biodegradable wastes (and in particular the organic matter contained therein) under the action of anaerobic microorganisms (bacteria) naturally present in the primary mixture 2A of wastes and/or added to the primary mixture 2A of wastes and/or caused to multiply in the primary mixture 2A of wastes. Preferably, such an anaerobic biological degradation unit comprises, in a manner known per se, at least one tank ("digester" or "methanizer"), which may be tightly closed (in particular with respect to oxygen) after introduction of the primary mixture 2A of wastes therein. If necessary, the wastes of the primary mixture 2A of wastes may have been previously moistened, hydrated, and/or added with anaerobic microorganisms (bacteria), enzymes, or a mixture of such anaerobic microorganisms and enzymes.

The secondary mixture 2B of materials to be treated by the treatment unit 1 of the plant thus advantageously has a non-negligible portion of its mass, which is formed by biodegradable materials that have been at least partially (and preferably only partially) biodegraded, under the effect of one or more biological degradation processes—aerobic and/or anaerobic—to which all or part of the primary mixture 2A of wastes has been subjected. Preferably, said biodegradable materials at least partially biodegraded then form at least 40%, preferably at least 45%, preferably at least 50%, preferably at least 60°%, preferably at least 70°%, more preferably at least 80%, of the mass of the secondary mixture 2B of materials implemented by the treatment unit 1. In this respect, the treatment plant 1 thus advantageously constitutes a unit for refining materials at least partially biodegraded.

The aerobic and/or anaerobic biological degradation unit(s) further advantageously comprise at least one drying rack (or dehydration rack) making it possible to apply a drying, dehydration, to the biodegradable materials at least partially biodegraded contained in the secondary mixture 2B of materials. Preferably, said drying rack is designed to reduce the moisture content of the biodegradable materials at least partially biodegraded to a value preferentially between 5% and 25%, preferably between 10% and 20%, more preferably between 12% and 18%. Such a moisture content advantageously makes it possible to further improve the quality of the dimensional sorting and densimetric sorting that will be operated by the trommel 3 and by the densimetric tables 6, 7 of the treatment unit 1, respectively, in particular by lowering the average density of said biodegraded biodegradable materials with respect to the average density of the other materials, non biodegradable, contained in said mixture. Moreover, such a moisture content makes it possible to limit, or even eliminate, the sticky nature of the biodegraded biodegradable materials, which is favorable to a good separation of the materials. Such a dehydration further advantageously allows a biological stabilization of the biodegradable materials at least partially biodegraded of the secondary mixture 2B of materials, which thus makes the storage and handling thereof easier. Moreover, when said biodegradable materials are advantageously only partially biodegraded, such a dehydration allows interrupting the biological degradation, and thus maintaining a certain compostability and/or methanogenic potential of the secondary mixture 2B of materials, for a later composting and/or maturation and/or methanization process.

Preferentially, the series of separation holes of the separation wall 4 of the trommel 3 comprises at least primary holes for at least contributing to separate the secondary mixture 2B of materials into the first fraction 5 of materials and the second residual fraction of materials by passage of the first fraction 5 of materials through said primary holes. Advantageously, these latter are evenly distributed, so as to form a meshing, over a major portion of the surface of the separation wall 4 of the trommel 3. Said primary holes of the separation wall 4 advantageously have a suitable size to prevent the passage of materials larger than 20 mm, preferably larger than 15 mm, preferably larger than 10 mm, and more preferably larger than 8 mm. The primary holes are preferentially circular in cross-section. So dimensioned, the primary holes of the separation wall 4 of the trommel 3 thus advantageously allow separating from the secondary mixture 2B of materials the large materials, which are a priori not liable to be biodegraded enough or which are not biodegradable at all. These large materials, which thus form said second residual fraction of materials, may be directed, as a whole or in part, to a biological degradation unit (aerobic or anaerobic) to be further biodegraded, or also to a solid recovered fuel production unit for their valorization, for example.

More preferentially, the series of separation holes of the trommel 3 of the treatment unit 1 also comprises secondary holes contributing to separate the secondary mixture 2B of materials into the first fraction 5 of materials and the second residual fraction of materials by passage of the first fraction 5 of materials through said secondary holes, these latter having a suitable size to enable the passage of materials the size of which is between 1 times and 1.5 times, and preferably equal to 1.2 times, the size of the materials the passage of which is enabled by the primary holes, the secondary holes being arranged upstream from the primary holes, with regards to the flow direction of the secondary mixture 2B of materials. Advantageously, the primary holes of the separation wall 4 being of suitable size to prevent the passage of materials larger than 10 mm, the secondary holes of the separation wall 4 are dimensioned in such a way as to prevent the passage of materials larger than 12 mm.

The separation wall 4 thus advantageously has a porosity decreasing along its length, in such a way that the secondary mixture 2B of materials is first placed in contact with the secondary holes, then with the primary holes, the size of the secondary holes being larger than that of the primary holes. The secondary holes are preferentially circular in cross-section. The secondary holes are preferentially evenly distributed, so as to form a meshing, over a minor portion of the surface of the separation wall 4 that is not occupied by the primary holes. The secondary holes advantageously allow including in the first fraction 5 of materials only a portion of materials having a larger size than that allowed by the primary holes and contained in the secondary mixture 2B of materials. Particularly advantageously, such a design makes it possible to ensure that the second residual fraction of materials contains a lesser proportion, if any, of biodegradable materials, even if a larger portion of non-biodegradable or insufficiently biodegraded materials is liable to be introduced into the first fraction 5 of materials. That way, the first fraction 5 of materials passing through the separation wall 4 of the trommel 3 may advantageously be essentially consisted of pieces of biodegradable materials at least partially biodegraded (and preferentially dried), pebbles, pieces of glass, plastic or possibly metal, said pieces being respectively very small, advantageously smaller than 12 mm, with a very limited size dispersion. These pieces can be easily presorted according to their density by the ballistic separation means 8 of the treatment unit 1, as described hereinabove, before being directed towards the densimetric tables 6, 7 of the treatment unit 1 in order to effectively undergo a finer and more accurate densimetric sorting.

Figure 3:
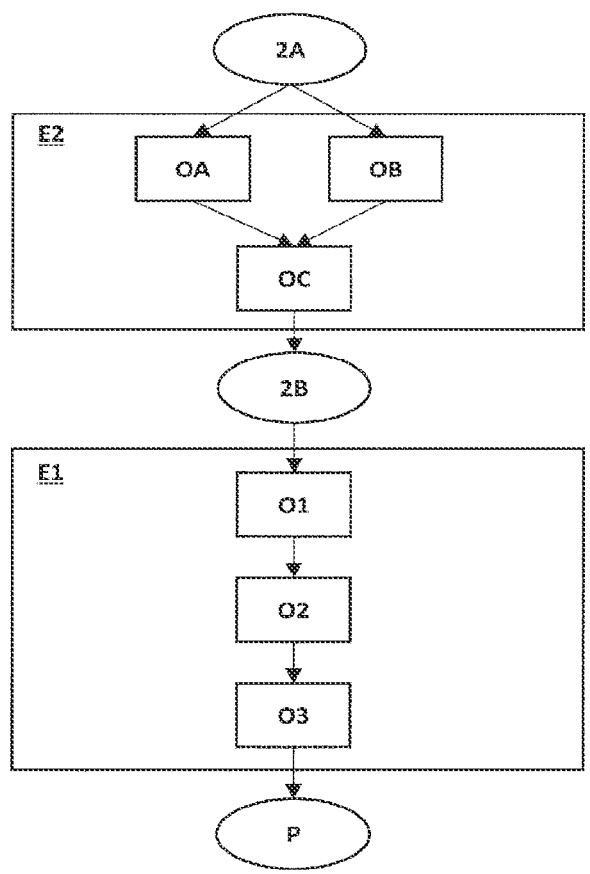
FIG. 3 schematically illustrates a method for treating a primary mixture of wastes it from household and similar refuse collection according to the invention.

As mentioned hereinabove, the invention also relates as such to a method for treating a primary mixture 2A of wastes from household and similar refuse collection as defined hereinabove. As will be described in more detail hereinafter, the treatment method according to the invention is preferentially intended to be implemented using a treatment plant according to the invention and as described hereinabove. Reciprocally, the treatment plant described hereinabove is advantageously intended to implement the treatment method according to the invention. Therefore, the features, definitions, effects and advantages described hereinabove in connection with the treatment plant apply—unless possibly otherwise stated—mutatis mutandis to the treatment method according to the invention, and vice versa. This being said, the treatment plant according to the invention is obviously not limited to the sole implementation of the treatment method according to the invention, and the latter, in turn, is not limited to an implementation using only a treatment plant as described hereinabove. A treatment method according to the invention is schematically illustrated in FIG. 3.

In accordance with the invention, the treatment method comprises a step E1 of treating a secondary mixture 2B of materials obtained from said primary mixture 2A of wastes, a non-negligible portion of the mass of said secondary mixture 2B of materials being formed by biodegradable materials. The treatment step E1 thus advantageously constitutes a step of post-treating or refining materials resulting from a first treatment previously carried out during the treatment method, and more specifically, a step of post-treating or refining a mixture rich in biodegradable materials. Preferentially, the biodegradable materials in question form at least 40%, preferably at least 45%, or preferably at least 50%, of the mass of the secondary mixture of materials implemented by the treatment unit.

Said treatment step E1 comprises the following successive steps:
  an operation O1 in which said secondary mixture 2B of materials is introduced into a rotary trommel 3 provided with a separation wall 4 with a series of separation through-holes, and said secondary mixture 2B of materials is separated into a first fraction 5 of materials passing through said separation wall 4 via the series of separation holes and a second residual fraction of materials, the secondary mixture 2B of materials flowing along said separation wall to be separated thereby,
  an operation O2 in which said first fraction 5 of materials is separated, using a ballistic separation means 8, into at least one first and second subtractions 9, 10 of materials, the first subtraction 9 of materials being formed of materials having an average density lower than the average density of the materials forming the second subtraction 10 of materials, and
  an operation O3 in which a densimetric sorting is applied to each of said first and second subfractions 9, 10 of materials, respectively, using at least one first and second densimetric tables (distinct from each other), each fed by said ballistic separation means 8.

The treatment method according to the invention is thus based on a combination of a dimensional sorting made using the trommel 3, and a densimetric sorting made using the densimetric tables 6, 7, The treatment method according to the invention thus implements at least two distinct densimetric tables 6, 7, advantageously arranged parallel to the flow of materials to be treated, each of them being feed with a particular subtraction 9, 10 of the first fraction 5 of materials sorted by the trommel 3. From then on, the flow of sorted materials exiting from the trommel 3 through the separation wall 4 thereof can be easily controlled, even at very high flow rates, by distributing the load on the two (or more) densimetric tables 6, 7. As mentioned hereinabove in connection with the treatment plant, the invention is further based on the observation that the performance of a densimetric table, both in term of flow rate and of sorting accuracy, can be optimized not only by carrying out a dimensional sorting upstream from the densimetric table in order to reduce the dimensional disparity of the materials subjected to the densimetric table, and by controlling the flow of materials entering the densimetric table, but also by feeding the densimetric table with materials whose density disparity has been controlled, limited, upstream from the densimetric table. The invention is moreover based on the idea that such a densimetric presorting of the first fraction 5 of materials coming from the trommel 3 can be carried out, in a simple and efficient way, using a ballistic separation means 8. Therefore, the treatment method according to the invention advantageously makes it possible to quickly sort, in a particularly accurate and efficient way, large volumes of household waste, which allows in fine particularly qualitative recycling and/or valorization of a very large portion of the primary mixture 2A of wastes, and in particular of the secondary mixture 2B of materials coming from the latter.

Said treatment step E1 is advantageously implemented using a treatment unit 1 in accordance with the detailed description made hereinabove in connection with the treatment plant and as illustrated by way of example in FIG. 1. In particular, according to a preferential embodiment, the ballistic separation means 8 implemented in operation O2 comprises:
  an inclined drop ramp 12 comprising, at an upstream end, a ramp portion, called collecting portion 13, that is positioned opposite the separation wall 4 of the trommel 3 to collect said first fraction 5 of materials, and an opposite, downstream end 14 that is positioned above and remote from a feed portion 15 of the conveyor means 11, and
  at least one ballistic distribution flap 16 that defines, on a conveying surface of said conveyor means 11, at least one first area 17 for conveying said first subfraction 9 of materials and a second area 18 for conveying said second subfraction 10 of materials.

Said conveyor means 11 then advantageously includes an evacuation portion 19 through which the first and second conveying areas 17, 18 each feed said first and second densimetric tables 6, 7, respectively. The ballistic separation means 8 and the conveyor means 11 implemented by the treatment method are advantageously respectively in line with those described in detail hereinbefore in connection with the treatment plant and illustrated by way of example in FIG. 2.

Preferably, a biological degradation process has been applied to at least part of the wastes contained in said primary mixture 2A of wastes, in order to biodegrade at least in part (and still preferably only in part) said biodegradable wastes and to form the secondary mixture 2B of materials. A non-negligible portion of the mass of the secondary mixture 2B of materials treated during the treatment step E1 is thus advantageously formed of biodegradable materials that have been at least partially (and still preferably only in part) biodegraded. As such, the treatment method can then comprise, previously to the treatment step E1, a step E2 of biological degradation for applying a biological degradation process to at least part of the biodegradable wastes contained in said primary mixture 2A of wastes, in order to biodegrade at least in part said biodegradable wastes and to thus form said secondary mixture 2B of materials. It is advantageously a forced, accelerated biological degradation process.

Advantageously, a biological degradation process, which is an aerobic biological degradation process, has been applied to at least part of the wastes contained in said primary mixture 2A of wastes, in such a way as to biodegrade at least in part said biodegradable wastes and to form said secondary mixture 2B of materials. A non-negligible portion of the mass of the secondary mixture 2B of materials treated during the treatment step E1 is thus formed of biodegradable materials that have been at least partially biodegraded, composted, under the effect of an aerobic biological degradation process (or "fermentation") to which all or part of the primary mixture 2A of wastes has previously been subjected. As such, the biological degradation step E2 can hence comprise an operation OA of aerobic biological degradation for applying an aerobic biological degradation process to at least part of the biodegradable wastes contained in said primary mixture 2A of wastes, in such a way as to degrade at least in part said biodegradable wastes and to thus form said secondary mixture 2B of materials. It is advantageously a forced, accelerated, aerobic biological degradation process. As known, such an aerobic biological degradation process consists of forcing the degradation and putrefaction of the biodegradable wastes under the action of microorganisms naturally present in the primary mixture 2A of wastes and/or added to the primary mixture 2A of wastes and/or caused to multiply in the primary mixture 2A of wastes. Such an operation OA of aerobic biological degradation can advantageously be implemented using at least one aerobic biological degradation unit comprising at least one aerobic biological degradation rack, in accordance with the description made hereinabove in connection with the treatment plant.

As an alternative or a complement, at least part of the wastes contained in said primary mixture 2A of wastes has undergone a biological degradation process that is an anaerobic biological degradation process, in order to biodegrade at least part of said biodegradable wastes, said secondary mixture 2B of materials being then formed of all or part of a residual matter resulting from said anaerobic biological degradation process. A non-negligible portion of the mass of the secondary mixture 2B of materials treated during the treatment step E1 is formed, in this case, of biodegradable materials that have been at least partially biodegraded, under the effect of an anaerobic biological degradation process (or "digestion") to which all or part of the primary mixture 2A of wastes has previously been subjected. As such, the biological degradation step E2 can hence advantageously comprise an operation OB of anaerobic biological degradation for applying an anaerobic biological degradation process, that is to say a methanization process, to at least part of the biodegradable wastes contained in said primary mixture 2A of wastes, said secondary mixture 2B of materials being then formed of all or part of a residual matter resulting from said anaerobic biological degradation process. It is advantageously a forced, accelerated, anaerobic biological degradation process. As known, such an anaerobic biological degradation process consists of forcing the degradation of the biodegradable wastes (and in particular the organic matter contained therein) under the action of anaerobic microorganisms (bacteria) naturally present in the primary mixture 2A of wastes and/or added to the primary mixture 2A of wastes and/or caused to multiply in the primary mixture 2A of wastes. Such an operation OB of anaerobic biological degradation can advantageously be implemented using at least one anaerobic biological degradation unit comprising at least one anaerobic biological degradation rack, in accordance with the description made hereinabove in connection with the treatment plant.

Said non-negligible portion formed of biodegradable materials at least partially biodegraded—in an aerobic and/or anaerobic way—then preferably represents at least 40%, preferably at least 45%, preferably at least 50% preferably at least 60%, preferably at least 70%, more preferably at least 80% of the mass of said secondary mixture 2B of materials. In this respect, the treatment step E1 of the treatment method thus more specifically constitutes a step of refining materials at least partially biodegraded.

Still more advantageously, said biodegradable materials at least partially degraded are biodegradable materials at least partially biodegraded and dried, which preferentially have a moisture content whose value is preferentially between 5% and 25%, preferably between 10% and 20%, more preferably between 12% and 18%. Such a moisture content advantageously makes it possible to further improve the quality of the dimensional sorting and the densimetric sorting that will be subsequently operated during the treatment step E1, in particular by lowering the average density of said biodegraded (biodegradable) materials with respect to the average density of the other materials, non biodegradable, contained in said mixture. Moreover, such a moisture content makes it possible to limit, or even eliminate, the sticky nature of the biodegraded biodegradable materials, which is favorable to a good separation of the materials during the treatment step E1 Such a dehydration further advantageously allows a biological stabilization of the biodegradable materials at least partially biodegraded of the secondary mixture 2B of materials, which thus makes the storage and handling thereof easier. Moreover, when said biodegradable materials are advantageously only partially biodegraded, such a dehydration allows interrupting the biological degradation, and thus maintaining a certain compostability and/or methanogenic potential of the secondary mixture 2B of materials, for a later composting and/or maturation and/or methanization process. As such, the biological degradation step E2 can thus advantageously comprise an operation OC, successive to operation OA and/or operation OB, in which a drying, dehydration, is applied to the biodegradable materials at least partially biodegraded contained in the secondary mixture 2B of materials, in such a way that a non-negligible portion of the mass of said secondary mixture 2B of materials is thus formed of biodegradable materials at least partially biodegraded and dried, dehydrated. Said operation OC is then advantageously carried out in such a way that said biodegradable materials at least partially biodegraded and dried have a moisture content whose value is preferentially between 5% and 25%, preferably between 10% and 20%, more preferably between 12% and 18%. Such a drying operation O0 can advantageously be implemented using at least one aerobic and/or anaerobic biological degradation unit comprising at least one drying rack (or dehydration rack), in accordance with the description made hereinabove in connection with the treatment plant.

Preferentially, the design of the series of separation holes of the separation wall 4 of the trommel 3 implemented during the operation O1 of the treatment step E1 is in line with that described hereinabove in connection with the treatment plant. In particular, said series of separation holes comprises at least primary holes, which are advantageously evenly distributed, in such a way as to form a meshing, over a major portion of the surface of the separation wall 4 of the trommel 3 and that advantageously have a suitable size to prevent the passage of materials larger than 20 mm, preferably larger than 15 mm, preferably larger than 10 mm, more preferably larger than 8 mm. The primary holes are preferentially of circular cross-section. So dimensioned, the primary holes of the separation wall 4 of the trommel 3 thus advantageously allow separating from the secondary mixture 2B of materials the large materials, which are a priori not liable to be biodegraded enough (and thus of quite reduced size). These large materials, which thus form said second residual fraction of materials, may be subjected, as a whole or in part, to a new step of biological degradation (aerobic or anaerobic) to be further biodegraded, or also to a step of solid recovered fuel production for their valorization for example. Even more preferentially, the series of separation holes of the trammel 3 also comprises secondary holes, which have a suitable size to enable the passage of materials the size of which is between 1 times and 1.5 times, and preferably equal to 1.2 times, the size of the materials the passage of which is enabled by the primary holes, and are arranged upstream from the primary holes, with regards to the flow direction of the secondary mixture 2B of materials. Advantageously, the primary holes of the separation wall 4 being of suitable size to prevent the passage of materials larger than 10 mm, the secondary holes of the separation wall 4 are dimensioned in such a way as to prevent the passage of materials larger than 12 mm.

As already explained hereinabove in connection with the treatment plant, the separation wall 4 thus advantageously has a porosity decreasing along its length, in such a way that the secondary mixture 2B of materials is first placed in contact with the secondary holes, then with the primary holes, the size of the secondary holes being larger than that of the primary holes. The secondary holes are preferentially circular in cross-section. The secondary holes are preferentially evenly distributed, so as to form a meshing, over a minor portion of the surface of the separation wall 4 that is not occupied by the primary holes. The secondary holes advantageously allow including in the first fraction 5 of materials only a portion of materials having a larger size than that allowed by the primary holes and contained in the secondary mixture 2B of materials. Particularly advantageously, such a design makes it possible to ensure that the second residual fraction of materials contains a lesser proportion, if any, of biodegradable materials, even if a larger portion of non-biodegradable or insufficiently biodegraded materials is liable to be introduced into the first fraction 5 of materials. That way, the first fraction 5 of materials passing through the separation wall 4 of the trammel 3 may advantageously be essentially consisted of pieces of biodegradable materials at least partially biodegraded (and preferentially dried), pebbles, pieces of glass, plastic or possibly metal, said pieces being respectively very small, advantageously smaller than 12 mm, with a very limited size dispersion. These pieces can be easily presorted according to their density by the ballistic separation means 8 during the operation O2 of the treatment step E1, as described hereinabove, before being directed towards the densimetric tables 6, 7 in order to effectively undergo a finer and more accurate densimetric sorting during the operation O3 of the treatment step E1.

Using the above-described treatment plant and method, it is advantageously possible to obtain from a primary mixture 2A of wastes from household and similar refuse collection, with an excellent efficiency, a product P essentially formed of biodegradable matter advantageously at least partially biodegraded (and then preferably only partially biodegraded) that is particularly pure, well refined. Such a product P can therefore be subsequently subjected to a cycle of composting and/or complementary maturation leading to an organic amendment or a compost of particularly high quality. Such a compost then advantageously meets the requirements of the French standard NF U 44-051: 2006 "Amendements organiques—Dénominations, spécifications et marquage" ("Organic amendments—Names, specifications and marking"). It is also possible to subsequently subject such a product P to a methanization process, after having possibly rehydrated it if necessary, to convert the biodegradable matter it contains into biogas. Contrary to the known processes of methanization of wastes from household refuse collection, such a process of methanization of the product P obtained thanks to the invention will then be particularly efficient and will advantageously produce with very little, if any, ultimate wastes to be landfilled or incinerated. Moreover, due to the purity of said product P, a residual biodegradable fraction ("digestate") resulting from such a later methanization process will be advantageously itself subjected to an additional composting and/or maturing process for its agronomic valorization, for example as an input in agriculture. The methanization process will be moreover of less expensive implementation because it won't be necessary in particular to oversize the tank(s) to take into account a large volume of non-biodegradable materials mixed with the biodegradable materials to be methanized.

Obviously, the treatment unit 1 of the plant could alternatively be intended to treat a secondary mixture of materials the biodegradable materials it contains have not (or not yet) undergone aerobic and/or anaerobic biological degradation. Symmetrically, the treatment step E1 of the method could alternatively be implemented to treat a secondary mixture of materials the biodegradable materials it contains have not (or not yet) undergone aerobic biological degradation. Moreover, and although a non-negligible portion of the mass of said secondary mixture of materials is formed by biodegradable materials, as mentioned hereinabove, it is nevertheless possible that the treatment unit 1 of the plant can be fed, for example, with a portion of said secondary mixture of materials that will be exclusively formed of non-biodegradable materials (for example, for a purpose of refining recyclable and/or valorizable materials extracted from the primary mixture 2A of wastes). In this case, the plant would not necessarily include any aerobic and/or anaerobic biological degradation unit(s), or the treatment unit would not be necessarily positioned downstream from such aerobic and/or anaerobic biological degradation units. The series of separation holes of the trammel 3 could comprise primary holes and secondary holes, arranged upstream from said primary holes considering the flow direction of the secondary mixture of materials, as described hereinabove, but the sizes and size ratios of these latter could be of different values than those mentioned hereinabove, depending on the composition and nature of the secondary mixture of materials. As regards the treatment method, it is nevertheless symmetrically possible that the treatment step E1 is applied, for example, to a portion of said secondary mixture of materials that would be exclusively formed of non-biodegradable materials (for example, for a purpose of refining recyclable and/or valorizable materials previously extracted from the primary mixture 2A of wastes).

On reading the detailed description that has just been given, it is understood that the treatment plant and method are particularly easy to implement in an industrial context, and in particular within the framework of an industrial process for the mechanical-biological treatment of household and similar refuse, and allow a treatment of the ongoing primary mixture 2A of wastes in a predominantly or even fully automated way. The improvement of performance provided by the treatment plant and method in terms of quickness and accuracy of sorting advantageously allow generating products, such as in particular compost or biogas, whose value is very higher than the initial value of the primary mixture 2A of wastes.

Possibility of Industrial Application

The invention finds its industrial application in the design, making and implementation of plants and methods for waste treatment, and in particular the treatment of wastes from household refuse collection, for the recycling, valorization or retreatment thereof.

The invention claimed is:

1. A plant for treating a primary mixture (2A) of wastes from household and similar refuse collection, a non-negligible portion of the mass of said primary mixture (2A) of wastes being formed by biodegradable wastes, said primary mixture (2A) of wastes comprising non-biodegradable wastes, said treatment plant comprising a unit (1) for treating a secondary mixture (2B) of materials obtained from said primary mixture (2A) of wastes, a non-negligible portion of the mass of said secondary mixture (2B) of materials being formed by biodegradable materials, said treatment unit (1) comprising a rotary trommel (3) provided with a separation wall (4) with a series of separation through-holes for separating the secondary mixture (2B) of materials into a first fraction (5) of materials passing through said separation wall (4) via the series of separation holes and a second residual fraction of materials, the secondary mixture (2B) of materials being intended to flow along said separation wall (4) to be separated thereby, said treatment unit (1) also comprising at least one first and second densimetric tables (6, 7), and a ballistic separation means (8) positioned between said trommel (3) and said densimetric tables (6, 7) to collect said first fraction (5) of materials and feed the first and second densimetric tables (6, 7) with at least one first and second subfractions (9, 10) of materials, respectively, the first subfraction (9) of materials being formed of materials having an average density lower than an average density of the materials forming the second subfraction (10) of materials;
wherein said treatment unit (1) comprises a conveyor means (11), which is positioned at a lower altitude than a respective altitude of the trommel (3), said ballistic separation means (8) comprising:
an inclined drop ramp (12) comprising, at an upstream end, a ramp portion, called collecting portion (13), that is positioned opposite the separation wall (4) of the trommel (3) to collect said first fraction (5) of materials, and having an opposite, downstream end (14) that is positioned above and remote from a feed portion (15) of the conveyor means (11), and
at least one ballistic distribution flap (16) that defines, on a conveying surface of said conveyor means (11), at least one first area (17) for conveying said first subfraction (9) of materials and a second area (18) for conveying said second subfraction (10) of materials,
said conveyor means (11) including an evacuation portion (19), through which the first and second conveying areas (17, 18) are able to feed each of said densimetric tables (6, 7), respectively;
wherein said drop ramp (12) comprises a ramp portion, called acceleration portion (20), that extends said collecting portion (13) up to the downstream end (14) of the drop ramp (12), and whose average inclination is adjustable with respect to the vertical;
wherein said separation wall (4) extends along a longitudinal axis of extension (A-A') about which said separation wall (4) is rotatably mounted, said drop ramp (12) extending longitudinally along said longitudinal axis of extension (A-A') of the separation wall (4); and
wherein the acceleration portion (20) of the drop ramp (12) has an average inclination with respect to the vertical that varies along said longitudinal axis of extension (A-A') of the separation wall (4); and wherein the series of separation holes of the separation wall (4) of the trommel (3) comprises at least primary holes for at least contributing to separate the secondary mixture (2B) of materials into the first fraction (5) of materials and the second residual fraction of materials by passage of the first fraction (5) of materials through said primary holes, these latter having a suitable size to prevent the passage of materials larger than 20 mm.

2. The treatment plant according to claim 1, wherein the separation wall (4) of the trommel (3) has a first vertical plane (P1) and a second plane (P2) orthogonal to said first plane (P1), said first and second planes (P1, P2) containing the longitudinal axis of extension (A-A') of the separation wall (4) and defining, below said second plane (P2), a first and second consecutive angular sectors (28, 29), the second angular sector (29) being located downstream from the first angular sector (28) in the direction of rotation of the separation wall (4), the drop ramp (12) being positioned opposite said second angular sector (29).

3. The treatment plant according to claim 1, wherein said series of separation holes of the separation wall (4) of the trommel (3) also comprises secondary holes contributing to the separation of the secondary mixture (2B) of materials into the first fraction (5) of materials and into the second residual fraction of materials by passage of the first fraction (5) of materials throughout said secondary holes, these latter having a suitable size to enable the passage of materials the size of which is comprised between 1 times and 1.5 times the size of the materials the passage of which is enabled by the primary holes, the secondary holes being arranged upstream from the primary holes with regards to the flow direction of the secondary mixture (2B) of materials.

4. The treatment plant according to claim 1, which comprises, upstream from said treatment unit (1), an aerobic or anaerobic biological degradation unit for applying a biological degradation process to the biodegradable wastes contained in said primary mixture (2A) of wastes, in order to biodegrade said biodegradable wastes and to thus form said secondary mixture (2B) of materials.

5. The treatment plant according to claim 4, wherein the aerobic or anaerobic biological degradation unit(s) comprise at least one drying rack making it possible to apply a drying to the biodegradable materials biodegraded in the secondary mixture (2B) of materials.

6. A method for treating a primary mixture (2A) of wastes from household and similar refuse collection, a non-negligible portion of the mass of said primary mixture (2A) of wastes being formed by biodegradable wastes, said primary mixture (2A) of wastes comprising non-biodegradable wastes, said method comprising a step E1 of treating a secondary mixture (2B) of materials obtained from said primary mixture (2A) of wastes, a non-negligible portion of the mass of said secondary mixture (2B) of materials being formed by biodegradable materials, said treatment step E1 comprising the following successive steps:
an operation O1 in which said secondary mixture (2B) of materials is introduced into a rotary trommel (3) provided with a separation wall (4) with a series of separation through-holes, and said secondary mixture (2B) of materials is separated into a first fraction (5) of materials passing through said separation wall (4) via the series of separation holes and a second residual fraction of materials, the secondary mixture (2B) of materials flowing along said separation wall (4) to be separated thereby,
an operation O2 in which said first fraction (5) of materials is separated, using a ballistic separation means (8), into at least one first and second subfractions (9, 10) of materials, the first subfraction (9) of materials being formed of materials having an average density lower than the average density of the materials forming the second subfraction (10) of materials, and an operation O3 in which a densimetric sorting is applied to each of said first and second subfractions (9, 10) of materials, respectively, using at least one first and second densimetric tables (6, 7), each fed by said ballistic separation means (8) wherein the ballistic separation means (8) implemented in operation O2 comprises:
- an inclined drop ramp (12) comprising, at an upstream end, a ramp portion, called collecting portion (13), that is positioned opposite the separation wall (4) of the trommel (3) to collect said first fraction (5) of materials, and an opposite, downstream end (14) that is positioned above and remote from a feed portion (15) of a conveyor means (11), which is positioned at a lower altitude than a respective altitude of the trommel (3), and
- at least one ballistic distribution flap (16) that defines, on a conveying surface of said conveyor means (11), at least one first area (17) for conveying said first subfraction (9) of materials and a second area (18) for conveying said second subfraction (10) of materials, said conveyor means (11) including an evacuation portion (19) through which the first and second conveying areas (17, 18) each feed said first and second densimetric tables (6, 7), respectively;
- wherein said drop ramp (12) comprises a ramp portion, called acceleration portion (20), that extends said collecting portion (13) up to the downstream end (14) of the drop ramp (12), and whose average inclination is adjustable with respect to the vertical;
- wherein said separation wall (4) extends along a longitudinal axis of extension (A-A') about which said separation wall (4) is rotatably mounted, said drop ramp (12) extending longitudinally along said longitudinal axis of extension (A-A') of the separation wall (4); and
- wherein the acceleration portion (20) of the drop ramp (12) has an average inclination with respect to the vertical that varies along said longitudinal axis of extension (A-A') of the separation wall (4); and
- wherein an aerobic or anaerobic biological degradation process has been applied to the wastes contained in said primary mixture (2A) of wastes, in order to biodegrade said biodegradable wastes, said secondary mixture (2B) of materials being then formed of all or part of a residual matter resulting from said aerobic or anaerobic biological degradation process.

7. The treatment method according to claim 6, wherein said biodegradable materials are biodegraded and dried, which have a moisture content whose value is between 5% and 25%.

8. A plant for treating a primary mixture (2A) of wastes from household and similar refuse collection, a non-negligible portion of the mass of said primary mixture (2A) of wastes being formed by biodegradable wastes, said primary mixture (2A) of wastes comprising non-biodegradable wastes, said treatment plant comprising a unit (1) for treating a secondary mixture (2B) of materials obtained from said primary mixture (2A) of wastes, a non-negligible portion of the mass of said secondary mixture (2B) of materials being formed by biodegradable materials, said treatment unit (1) comprising a rotary trommel (3) provided with a separation wall (4) with a series of separation through-holes for separating the secondary mixture (2B) of materials into a first fraction (5) of materials passing through said separation wall (4) via the series of separation holes and a second residual fraction of materials, the secondary mixture (2B) of materials being intended to flow along said separation wall (4) to be separated thereby, said treatment unit (1) also comprising at least one first and second densimetric tables (6, 7), and a ballistic separation means (8) positioned between said trommel (3) and said densimetric tables (6, 7) to collect said first fraction (5) of materials and feed the first and second densimetric tables (6, 7) with at least one first and second subfractions (9, 10) of materials, respectively, the first subfraction (9) of materials being formed of materials having an average density lower than an average density of the materials forming the second subfraction (10) of materials;
- wherein said treatment unit (1) comprises a conveyor means (11), which is positioned at a lower altitude than a respective altitude of the trommel (3), said ballistic separation means (8) comprising:
  - an inclined drop ramp (12) comprising, at an upstream end, a ramp portion, called collecting portion (13), that is positioned opposite the separation wall (4) of the trommel (3) to collect said first fraction (5) of materials, and having an opposite, downstream end (14) that is positioned above and remote from a feed portion (15) of the conveyor means (11);
  - at least one ballistic distribution flap (16) that defines, on a conveying surface of said conveyor means (11), at least one first area (17) for conveying said first subfraction (9) of materials and a second area (18) for conveying said second subfraction (10) of materials,
- said conveyor means (11) including an evacuation portion (19), through which the first and second conveying areas (17, 18) are able to feed each of said densimetric tables (6, 7), respectively;
- wherein said drop ramp (12) comprises a ramp portion, called acceleration portion (20), that extends said collecting portion (13) up to the downstream end (14) of the drop ramp (12), and whose average inclination is adjustable with respect to the vertical;
- wherein said separation wall (4) extends along a longitudinal axis of extension (A-A') about which said separation wall (4) is rotatably mounted, said drop ramp (12) extending longitudinally along said longitudinal axis of extension (A-A') of the separation wall (4);
- wherein the acceleration portion (20) of the drop ramp (12) has an average inclination with respect to the vertical that varies along said longitudinal axis of extension (A-A') of the separation wall (4); and
- upstream from said treatment unit (1), an aerobic or anaerobic biological degradation unit for applying a biological degradation process to the biodegradable wastes contained in said primary mixture (2A) of wastes, in order to biodegrade said biodegradable wastes and to thus form said secondary mixture (2B) of materials.

9. The treatment plant according to claim 8, wherein the aerobic or anaerobic biological degradation unit(s) comprise at least one drying rack making it possible to apply a drying to the biodegradable materials biodegraded in the secondary mixture (2B) of materials.

* * * * *